US007127593B2

(12) United States Patent
Wilson

(10) Patent No.: US 7,127,593 B2
(45) Date of Patent: Oct. 24, 2006

(54) CONDITIONAL EXECUTION WITH MULTIPLE DESTINATION STORES

(75) Inventor: Sophie Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 730 days.

(21) Appl. No.: 10/120,161

(22) Filed: Apr. 11, 2002

(65) Prior Publication Data

US 2003/0074544 A1 Apr. 17, 2003

Related U.S. Application Data

(60) Provisional application No. 60/296,757, filed on Jun. 11, 2001, provisional application No. 60/296,758, filed on Jun. 11, 2001, provisional application No. 60/296,747, filed on Jun. 11, 2001.

(51) Int. Cl.
*G06F 15/00* (2006.01)

(52) U.S. Cl. ......................... 712/226; 712/22

(58) Field of Classification Search ............... 712/226, 712/225, 22, 25, 26, 237
See application file for complete search history.

(56) References Cited

U.S. PATENT DOCUMENTS

| | | | |
|---|---|---|---|
| 3,325,785 A | | 6/1967 | Stevens |
| 3,958,227 A | | 5/1976 | Evans |
| 4,589,065 A | | 5/1986 | Auslander et al. |
| 4,589,087 A | | 5/1986 | Auslander et al. |
| 4,748,585 A | | 5/1988 | Chiarulli et al. |
| 5,056,015 A | | 10/1991 | Baldwin et al. |
| 5,471,593 A | * | 11/1995 | Branigin ............... 712/235 |
| 5,530,825 A | | 6/1996 | Black et al. |
| 5,542,084 A | | 7/1996 | Lowe, Jr. |
| 5,555,428 A | | 9/1996 | Radigan et al. |
| 5,568,631 A | | 10/1996 | Webb |
| 5,615,386 A | | 3/1997 | Amerson et al. |

(Continued)

FOREIGN PATENT DOCUMENTS

EP 0 130 381 1/1985

(Continued)

OTHER PUBLICATIONS

International Search Report issued Mar. 19, 2003 for Appl. No. EP 02 25 4000, 3 pages.

(Continued)

*Primary Examiner*—Henry W. H. Tsai
(74) *Attorney, Agent, or Firm*—Sterne Kessler Goldstein & Fox PLLC

(57) ABSTRACT

A method for conditionally performing a SIMD operation causing a predetermined number of result objects to be held in a combination of different ones of a plurality of destination stores, the method comprising receiving and decoding instruction fields to determine at least one source store, a plurality of destination stores and at least one control store, said source and destination stores being capable of holding one or a plurality of objects, each object defining a SIMD lane. Conditional execution of the operation on a per SIMD lane basis is controlled using a plurality of pre-set indicators of the at least one control store designated in the instruction, wherein each said pre-set indicator i controls a predetermined number of result lanes p, where p takes a value greater than or equal to two. A predetermined number of result objects are sent to the destination stores such that the predetermined number of result objects are held by a combination of different ones of the plurality of destination stores.

19 Claims, 13 Drawing Sheets

U.S. PATENT DOCUMENTS

| | | | |
|---|---|---|---|
| 5,838,984 A * | 11/1998 | Nguyen et al. | 712/5 |
| 5,996,070 A | 11/1999 | Yamada et al. | |
| 6,052,776 A | 4/2000 | Miki et al. | |
| 6,282,628 B1 | 8/2001 | Dubey et al. | |
| 6,298,438 B1 | 10/2001 | Thayer et al. | |
| 6,336,178 B1 | 1/2002 | Favor | |
| 6,338,137 B1 | 1/2002 | Shiell et al. | |
| 6,676,291 B1 | 1/2004 | Ahn | |
| 6,748,521 B1 | 6/2004 | Hoyle | |
| 6,757,819 B1 | 6/2004 | Hoyle et al. | |
| 6,772,325 B1 | 8/2004 | Irie et al. | |
| 2001/0042190 A1 * | 11/2001 | Tremblay et al. | 712/208 |

FOREIGN PATENT DOCUMENTS

| | | |
|---|---|---|
| EP | 0 395 348 | 10/1990 |
| EP | 1 089 170 | 4/2001 |
| WO | WO 01/06353 | 1/2001 |

OTHER PUBLICATIONS

Heinrich, Joe, MIPS R4000 Microprocessor User's Manual 2$^{nd}$ ed. 1994. p. A-33.

Hennessy and Patterson. Computer Organization and Design, 2$^{nd}$ ed. Morgan Kaufmann Publishers, Inc., 1998, pp. 384, 386 and 387.

Intel Architecture Software Developer's Manual, 1997, vol. 1: Basic Architecture, pp. 3-10 to 3-12, 6-23, 6-31 to 6-33, A-1 to A-4 and B-1 to B-2 and vol. 2, Instruction Set Reference, pp. 3-241 to 3-243.

The PowerPC Architecture: A Specification for a New Family of RISC Processors, Morgan Kaufmann Publishers, Inc, 1994, pp. 36-37.

Lee, Ruby B., "Subword Parallelism With MAX-2" *IEEE Inc.*, vol. 16, No. 4, 1996.

* cited by examiner

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | OPCODE | | | | | | | | | | Gsrc2 | | | | | Gsrc1 | | | | | Gdest | | | | | Psrc | | | | | |
| 1 | OPCODE | | | | | | | | | | Imm8 | | | | | Gsrc1 | | | | | Gdest | | | | | Psrc | | | | | |
| 1 | OPCODE | | | | | | | ImmExtn24 | | | | | | | | | | | | | | | | | | | | | | | |
| 0 | OPCODE | | | | | wbwi/d | | scale | | Gsrc2(index) | | | | | | Gdata | | | | | Gbase | | | | | Psrc | | | | |
| 2 | OPCODE | | | | | am/wb | | Imm9 | | | | | | | | | | | Gdata | | | | | Gbase | | | | | Psrc | | |
| 3 | ps2 | ls2 | ld | - | am/wb | | | Imm9 | | | | | | | | | | | Gdata | | | | | Gbase | | | | | Psrc | | |
| 0 | OPCODE | | | | | hint | | | | | | Gsrc | | | | | Pbit | | | | - | | | Gdest(link) | | | | | Psrc | | |
| 1 | OPCODE | | | | | hint | | | | | Imm9 | | | | | | | | Pbit | | | | - | | | Gdest(link) | | | | | Psrc |

|   | B0 | B1 | B2 | B3 | B4 | B5 | B6 | B7 |   |
|---|----|----|----|----|----|----|----|----|---|
| 0 |    |    |    |    |    |    |    |    | 63 | src1 less than?

|   | B0 | B1 | B2 | B3 | B4 | B5 | B6 | B7 |   |
|---|----|----|----|----|----|----|----|----|---|
| 0 | v  | v  | v  | v  | v  | v  | v  | v  | 63 | src2 writes

|   | B0 | B1 | B2 | B3 | B4 | B5 | B6 | B7 |
|---|----|----|----|----|----|----|----|----|
|   | =  | =  | =  | =  | =  | =  | =  | =  |
|   | 0  | 1  | 2  | 3  | 4  | 5  | 6  | 7  | pr1

| t | t | t | f | t | f | t | t |
|---|---|---|---|---|---|---|---|

*Fig. 8A*

CONDITIONAL EXECUTION WITH MULTIPLE DESTINATION STORES

CROSS REFERENCE TO RELATED APPLICATIONS

This patent application claims priority from the following provisional applications: U.S. application Ser. No. 60/296,757, filed on Jun. 11, 2001 and entitled "Conditional Execution Per Lane"; U.S. application Ser. No. 60/296,758, filed on Jun. 11, 2001 and entitled "Conditional Branch Execution"; and U.S. application Ser. No. 60/296,747, filed on Jun. 11, 2001 and entitled "Setting Execution Conditions". Each of these applications is incorporated in its entirety as if fully set forth herein.

BACKGROUND OF THE INVENTION

1. Field of the Invention

The present invention relates to a computer system for conditionally carrying out an operation defined in a computer instruction, and particularly to methods and means for controlling conditional execution of instructions which cause results to be held in multiple destination stores.

2. Background

Single Instruction Multiple Data (SIMD) computer systems are known which act on so-called packed operands. That is, each operand comprises a plurality of packed objects held in respective lanes of the operand. The degree of packing can vary and for sixty-four bit operands it is known to provide eight bit objects (8 objects per 64 bit operand), 16 bit objects (4 objects per 64 bit operand) and 32 bit objects (2 objects per 64 bit operand). A known computer system can conditionally execute instructions on a per operand lane basis according to respective condition codes held in a condition code register. This known computer system is described in detail in WO 01/06353 A10. A problem with this type of computer system is that it does not provide for per SIMD lane conditional execution of instructions which cause results to be sent to a plurality of different result stores. A further problem with this type of known system is the need to manage the contents of a test register by means of additional operations to control which lanes are executed.

The present invention seeks to provide an improved method and apparatus for conditionally executing instructions.

SUMMARY OF THE INVENTION

According to an aspect of the present invention, there is provided a method for conditionally performing a SIMD operation causing a predetermined number of result objects to be held in a combination of different ones of a plurality of destination stores, the method comprises receiving and decoding instruction fields to determine at least one source store, a plurality of destination stores and at least one control store, said source and destination stores being capable of holding one or a plurality of objects, each object defining a SIMD lane; controlling conditional execution of the operation on a per SIMD lane basis using a plurality of pre-set indicators of the at least one control store designated in the instruction, wherein each said pre-set indicator i controls a predetermined number of result lanes p, where p takes a value greater than or equal to two; and sending a predetermined number of result objects to said destination stores such that the predetermined number of said result objects are held by a combination of different ones of the plurality of destination stores.

In preferred embodiments per SIMD lane conditional execution is controlled by respective pre-set indicators i of a first control store which each control a plurality of corresponding result lanes $p*i, p*i+1, \ldots p*i+(p-1)$. Typically, the at least one control store comprises a predicate register. Where an operation being performed produces a double sized product it is convenient, but not necessary, for each predicate bit to control two result lanes.

According to another aspect of the present invention, there is provided a computer system for conditionally performing a SIMD operation causing a predetermined number of result objects to be held in a combination of different ones of a plurality of a destination stores, the computer system comprising: decode circuitry for receiving and decoding an instruction and operable to determine at least one source store, a plurality of destination stores and at least one control store for controlling per SIMD lane conditional execution, said source and destination stores being capable of holding one or a plurality of objects each defining a SIMD lane; a plurality of operators operable to perform the operation defined in the instruction on each said SIMD lane; control circuitry for controlling per SIMD lane conditional execution of the operation, wherein the control circuitry comprises at least one control store having a plurality of pre-set indicators to indicate for each of a plurality of result lanes whether or not a result should be generated on that result lane, each said pre-set indicator i being operable to control a predetermined number of result lanes p, where p takes a value greater than or equal to two; and a plurality of destination stores connected to receive a predetermined number of result objects, wherein the predetermined number of result objects are held by a combination of different ones of the plurality of destination stores.

According to another aspect of the present invention, there is provided a method for conditionally performing a SIMD operation defined in a computer instruction and causing result objects to be sent to different ones of a plurality of destination stores, the method comprising: receiving and decoding an instruction defining an operation, the instruction indicating at least one source store, a plurality of destination stores, and at least one control store, each said source and destination store being capable of holding one or a plurality of objects each defining a SIMD lane; controlling per SIMD lane conditional execution of the operation, wherein respective pre-set indicators i of a first control store control a plurality p of corresponding result lanes $p*i, p*i+1 \ldots p*1+(p-1)$ to said destination stores; and sending objects resulting from the operation on respective predetermined lanes to said plurality of destination stores.

According to another aspect of the present invention, there is provided a method for conditionally performing multiple data processing operations and multiple load/store operations contemporaneously, the method comprising: defining first and second SIMD execution channels, each being capable of processing a data processing operation and a load/store operation contemporaneously; receiving and decoding a first portion of an instruction responsive to which parameters defining first and second data processing operations are supplied to the first and second execution channels, respectively; receiving and decoding a second portion of an instruction responsive to which parameters defining first and second load/store operations are supplied to the first and second execution channels, respectively; and performing said first and second data processing operation and said first and second load/store operations contemporaneously.

According to another aspect of the present invention, there is provided a method for conditionally performing a SIMD operation causing a predetermined number of result objects to be held in a combination of different ones of a plurality of destination stores; receiving and decoding instruction fields to determine first and second sets of source stores, a plurality of destination stores and first and second control stores, each of said source and destination stores being capable of holding one or a plurality of objects each defining a SIMD lane; controlling per SIMD lane conditional execution using a plurality of pre-set indicators, wherein respective pre-set indicators in said first and second control stores control respective corresponding result lanes contemporaneously; and sending a predetermined number of result objects to said destination stores such that a predetermined number of said result objects are held by a combination of different ones of the plurality of destination stores.

According to another aspect of the present invention, there is provided a computer system for conditionally performing a SIMD operation causing a predetermined number of result objects to be held in a combination of different ones of a plurality of destination stores, the computer system comprising: a plurality of stores including source stores, destination stores and control stores; decode circuitry for receiving and decoding instruction fields to determine first and second sets of source stores, a plurality of destination stores, and first and second control stores, each said source and destination store being capable of defining an SIMD lane; and a plurality of operators operable to perform the operation defined in the instruction on each SIMD lane; wherein said first and second control stores comprise a plurality of pre-set indicators for controlling per SIMD lane conditional execution, respective pre-set indicators in said first and second control stores each being operable to control conditional execution of corresponding respective result lanes contemporaneously.

Aspects of the invention also relate to program code and program code products comprising code for performing the various methods described.

Additional objects, advantages and novel features of the invention will be set forth in part in the description which follows and in part will become apparent to those skilled in the art upon examination of the following and the accompanying drawings or may be learnt by practice of the invention. The objects and advantages of the present invention may be realised and obtained by means of the instrumentalities and combinations particularly pointed out in the appended claims.

BRIEF DESCRIPTION OF THE DRAWINGS

For a better understanding of the present invention and as to how the same may be carried into effect, reference will now be made way of example to the accompanying drawings in which:

FIG. 5B illustrates a plurality of 32 bit instruction formats suitable for inclusion in the 64 bit formats of FIG. 5A;

FIG. 8A illustrates a first example of a predicate register setting operation.

DETAILED DESCRIPTION OF PREFERRED EMBODIMENT

Reference is now made in detail to the presently preferred embodiment of the invention, examples of which are illustrated in the accompanying drawings and discussed below. The illustrated computer system is designed to process large volumes of data in a complex way, with the capability of using many different algorithms at once. For example, the computer system disclosed herein supports processing of signed 16 bit values and signed 32 bit values as well as signed and unsigned bytes.

Figure 1:
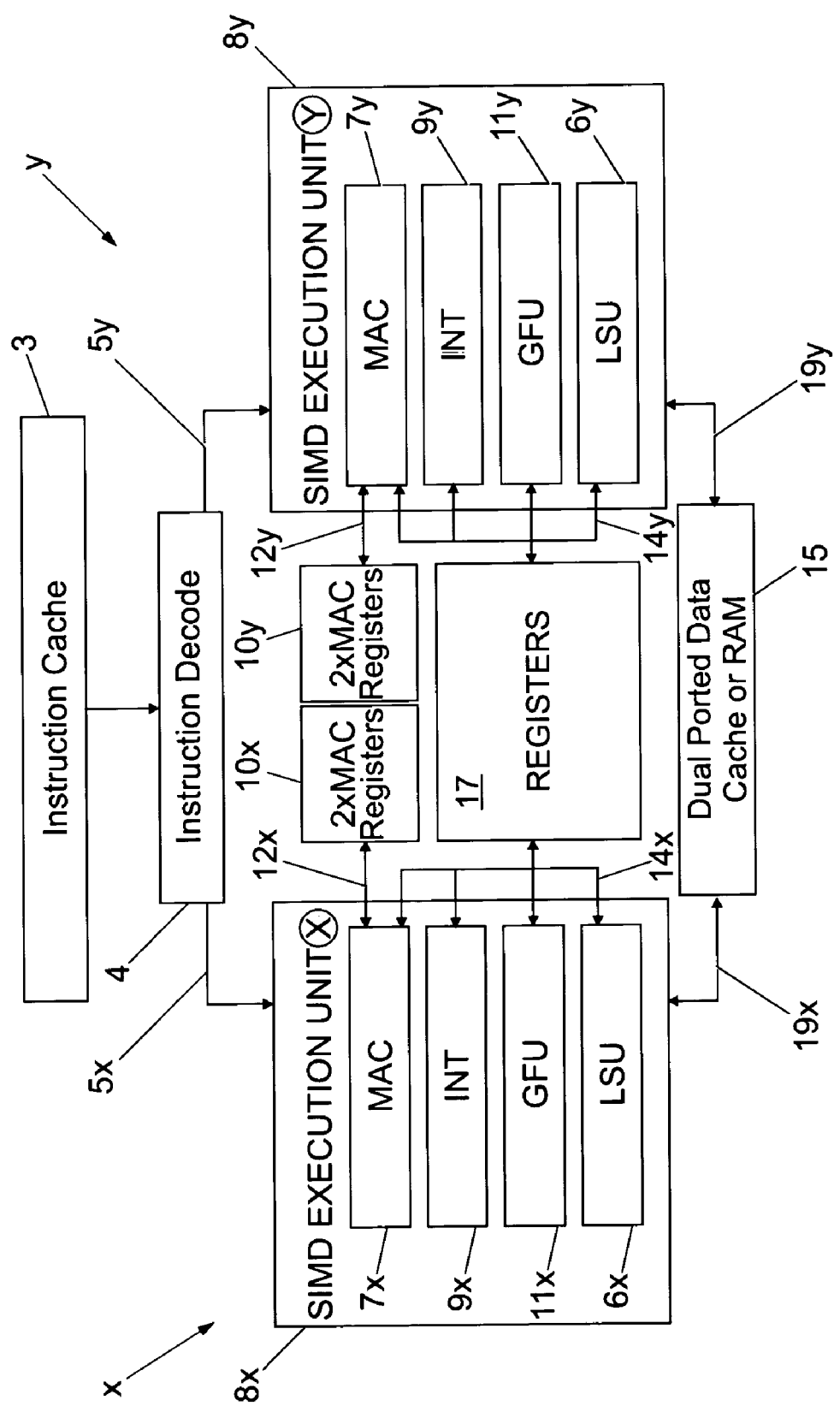
FIG. 1 is a schematic block diagram illustrating a computer system embodying the present invention.

FIG. 1 illustrates a computer system embodying the present invention. This computer system is a symmetric long instruction word processor having two execution channels. Each of the execution channels may be regarded as a single instruction multiple data (SIMD) enhanced HARVARD RISC channel. Long instruction words (64 bits) allow a programmer to program a variety of operations on one or both of the execution channels, as will be explained in more detail hereinafter.

The computer system includes two identical SIMD channels designated by reference numerals X and Y. The computer system is provided with an instruction cache 3 for receiving and holding instructions from a program memory (not shown). The instruction cache 3 is connected to instruction fetch/decode circuitry 4. The computer system includes a dual ported data cache 15 connected to both the X and Y-side SIMD units by 16 bit wide buses 19X, 19Y. The dual ported data cache 15 is also connected to a data memory (not shown).

Each of the SIMD execution units 8X, 8Y includes three data processing units, namely a Multiplier Accumulator Unit MAC 7X, 7Y, an Integer Unit INT 9X, 9Y, and a Galois Field Unit GFU 11X, 11Y. A load/store unit LSU 6X, 6Y is provided on each of the X and Y side SIMD units.

The computer system has a block of state registers 17 and two sets of dedicated MAC registers MAC 10X, 10Y for holding the multiply accumulate results. The details of these registers are described in more detail hereinafter.

The fetch/decode circuitry 4 issues addresses in the program memory from which instructions are to be fetched and receives on each fetch operation a 64 bit instruction from the cache 3 (or program memory). The fetch/decode circuitry 4 evaluates the opcode and transmits control signals along the channels 5X, 5Y to control the movement of data between designated registers and the MAC, INT, GFU and LSU functional units. For each channel 5X, 5Y, the instruction is supplied to the appropriate one of the MAC, INT or GFU if the instruction defines a data-processing operation. An instruction is supplied to the LSU if it defines a load/store operation.

Data values may be transferred to and from the MAC data-processing units into and out of the MAC registers 10X, 10Y along register access paths 12X and 12Y. Data values may be loaded to and from the INT, GFU, MAC and load store units into and out of general purpose registers included in the register block 17 along register access paths 14X and 14Y. Each register access path can carry data between the accessing unit, and register addresses designated in instructions. The register access paths also carry control data to and from control registers within the general purpose blocks.

The 64 bit long instruction word includes two instruction portions, which can define either a single operation according to a long 64 bit instruction format or two independent operations according to a 32 instruction format. Examples of long and short instruction formats are provided later with reference to FIGS. 5A and 5B. A special type of operation referred to herein as a dual operation can be caused by one half of the 32 bit instruction portion. In fact, either or both of the 32 bit instruction portions in a long instruction word can define dual operations so that, for example, one half of the long instruction word can cause two SIMD MAC (or ALU) operations per cycle, while the other half of the long instruction word can cause two load/store operations per cycle. In this way, the preferred architecture allows programmers to access both load store units and both MAC or both ALU(s) at the same time.

Figure 2A:
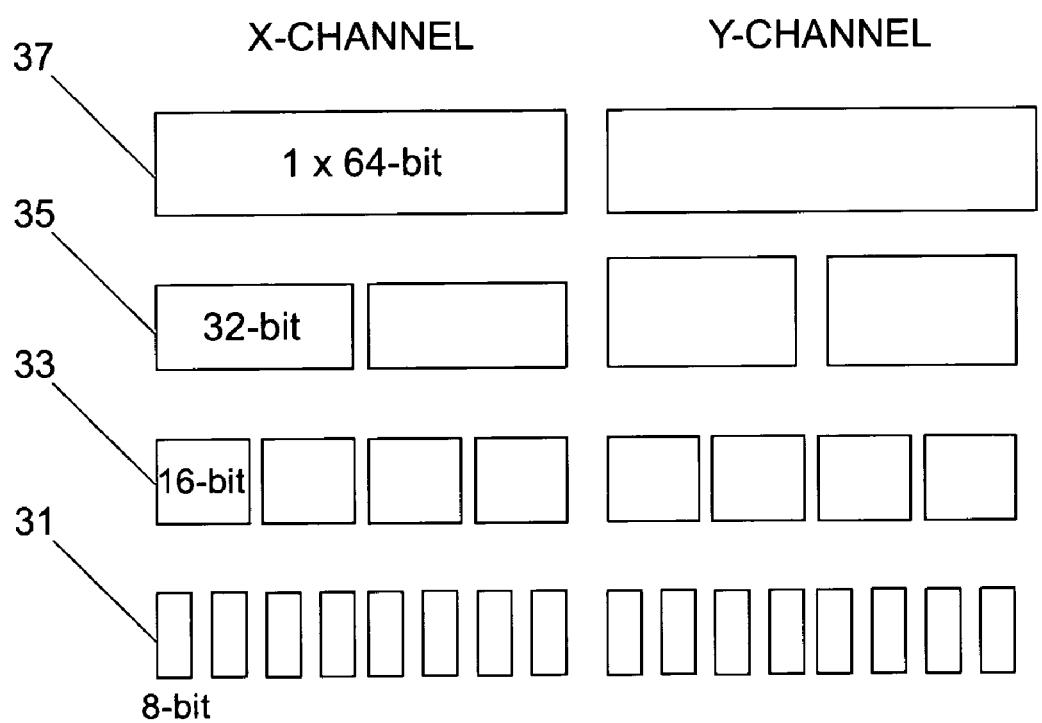
FIG. 2A is a schematic diagram illustrating different SIMD lane sizes employed in the computer system of FIG. 1.

FIG. 2A schematically illustrates the various operand lane sizes which may be applied on the X and Y-side execution channels. Each of the X and Y-side execution channels can have one 64 bit data path 37, providing a total data path width of 128 bits per cycle. Similarly, each of the X and Y-side channels may function as one 64 bit data path, two 32 bit data paths 35, four 16 bit data paths 33, or eight 8 bit paths 31. It is possible for the X and Y-side channels to employ different data path widths in the same or successive clock cycles. Data operations generally employ a first operand and a second operand (which may be an immediate value) to produce a result. Each operand is obtained from a source register (unless it is an immediate value) and the result is sent to a destination register. The source and destination registers may be, for example, MAC or general purpose registers.

The MAC, INT, GFU and LSU of each channel X, Y operate on a single instruction multiple data principle according to the SIMD lane expressed in the instruction. Data processing operations operate on 64 bits of information at the same time, but treat the information as 8 bytes, four half words, two words or one long word according to the following protocol defining the degree of packing of objects:

B-8 bit objects (also referred to as bytes B0 . . . B7);

H-16 bit objects (also referred to as half words H0 . . . H3);

W-32 bit objects (also referred to as words W0 . . . W1);

L-64 bit objects (also referred to as long words L).

Dual operations use even/odd pairs of registers to perform operations on 128 bits of information at the same time. According to the above protocol, dual instructions are represented as:

DL-128 bit objects (also referred to as double long words)

In the case of floating point processing operations, data may be handled with two different degrees of precision, namely:

S-32 bit floating point values (also referred to as single precision); and

D-64 bit floating point values (also referred to as double precision).

Figure 2B:
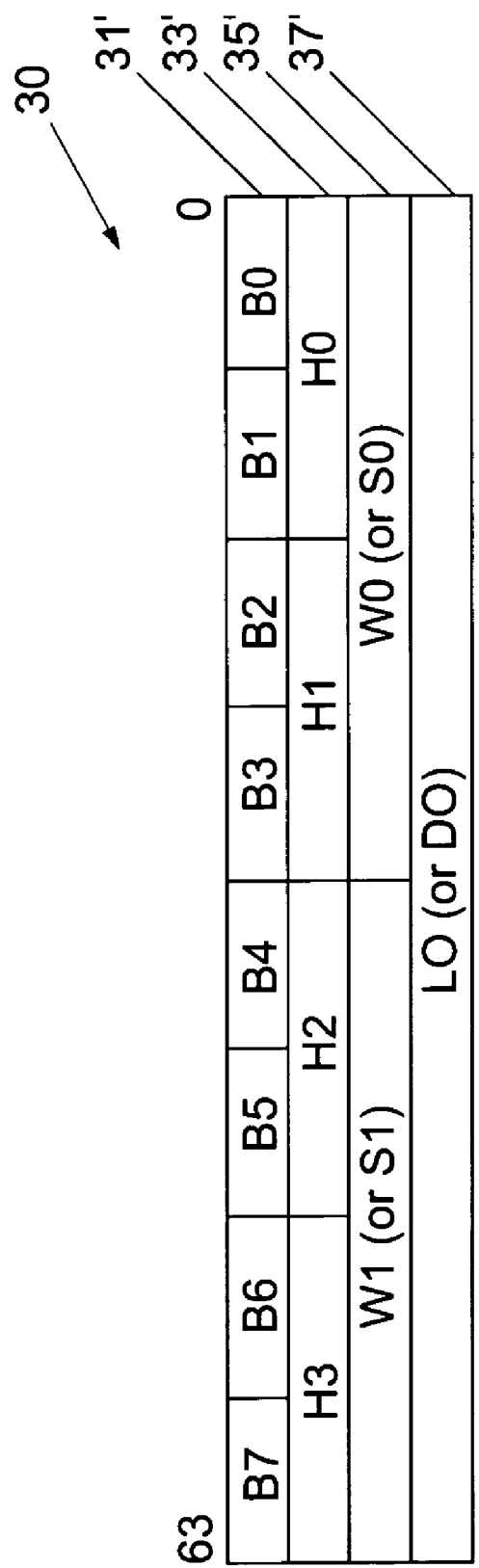
FIG. 2B is a schematic diagram illustrating differing degrees of packing in a state register of the computer system of FIG. 1.

FIG. 2B depicts a diagram 30 illustrating how various data path widths are achieved using 64 bit general purpose registers in the register block 17 of FIG. 1. Each general purpose register contains 64 bits of information which may be allocated as 8 bytes 31'(B0. . .B7), four half words 33'(H0. . .H3), two words 35'(W0. . .W1) or a single long word 37'. Similarly, floating point values may be stored as 32 bit single precision values S0, S1 or as 64 bit double precision values.

Figure 3:
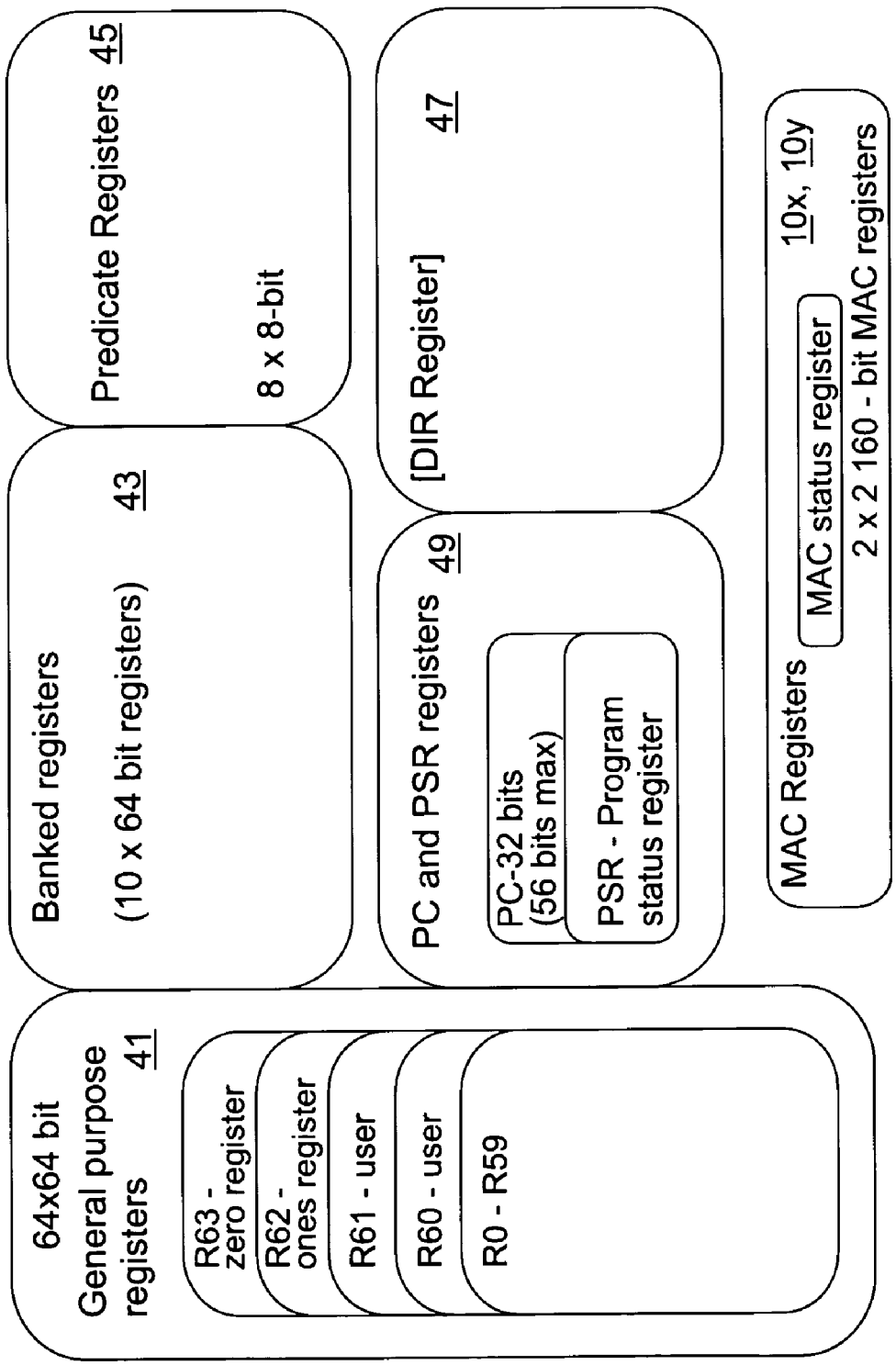
FIG. 3 is a schematic diagram illustrating different types of state provided in a computer system of FIG. 1.

FIG. 3 schematically illustrates the different types of state provided in the computer system of FIG. 1. The state registers include sixty-four general purpose registers 41 (each 64 bits in size), two pairs of MAC registers 10X, 10Y (each 160 bits in size), ten banked registers 43 (each 64 bits in size), eight predicate registers 45 (each 8 bits in size), and a set of hardware directive DIR registers 47. The computer system of FIG. 1 also includes a program counter PC, a program status register PSR 49 and a MAC status register.

The general purpose registers 41 include a "zero" register R63, a "ones" register R62, a first user register R61 for holding supervisor context, interrupt context and super interrupt context and a second user register R60 for holding supervisor-saved program count information, interrupt-saved program count information and super-interrupt program count information. The general purpose registers 56 to 59 are for use in super-interrupt modes. Each of the remaining general purpose registers may be regarded as being available as source or destination registers for data processing and other operations, and, as mentioned above, are capable of treating information as 8 bit, 16 bit, 32 bit or 64 bit objects.

The MAC registers 10X, 10Y are SIMD multiply accumulate unit accumulators. They are for holding multiply accumulate results. The MAC registers are wider than the 64 bit general purpose registers, the additional precision being used to accommodate the results of multiply accumulate operations.

The banked registers 43 provide rapid access to new context information for interrupts.

The predicate registers 45 are used to control conditional execution of operations on a per SIMD lane basis. More detail on this process is provided hereinafter.

The DIR registers 47 provide means for performing various non-standard tasks, for example controlling interrupts timing, break points and watch points.

Figure 4:
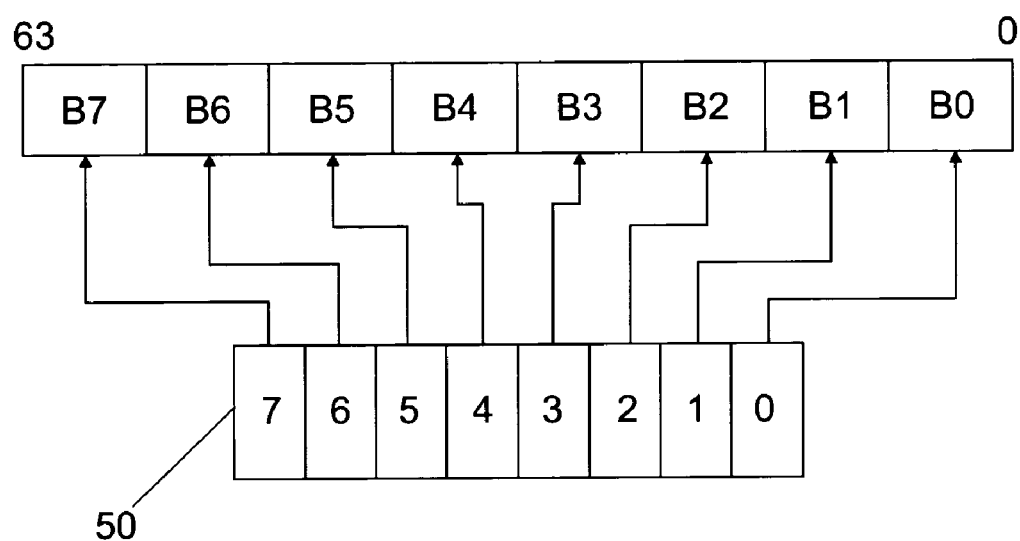
FIG. 4 illustrates a predicate register of the computer system of FIG. 1.

The computer system of FIG. 1 provides for conditional execution of multiple data processing operations on a per SIMD lane basis, lane size being defined by the degree of packing of operands. FIG. 4 shows by way of example one of the eight predicate registers pr0–pr7. Each predicate register 50 is eight bits 0–7 in size, having one bit value (TRUE or FALSE) for each of the eight byte lanes $B_0$–$B_7$ of the data path. The individual bits of a predicate register can be set TRUE or FALSE by means of data processing operations, as will be explained in detail hereinafter. When an SIMD instruction is processed the operation defined in the instruction is only performed and written to a destination register on byte lanes where the controlling predicate register bit is TRUE. No results are written to the destination register for byte lanes where the controlling predicate register bits are FALSE. In this embodiment, one predicate register pr7 is permanently set with all bits TRUE. The predicate registers can be accessed from both the X and Y-sides of the machine for the purposes of being set and of controlling conditional execution.

An instruction for an operation which is to be conditionally executed on a per lane basis includes a field indicating which of the eight predicate registers should control the operation defined in the instruction. The decode circuitry includes control circuitry for determining a controlling predicate register from this field, and flags within the controlling predicate register are checked by predicate checking circuitry. Each bit 0–7 of the designated predicate register controls the correspondingly numbered byte lane $B_0$–$B_7$ used in the operation. That is, bit i of the designated predicate register controls the conditional execution of SIMD the byte sized result lane Bi as illustrated on FIG. 4. It will be apparent that the result lanes can be of any predetermined width.

Where operations generate results to be held in a plurality of general purpose registers it is possible for the per SIMD lane conditional execution to be controlled by a single or multiple predicate registers as will be explained in detail with reference to FIGS. 7A and 7B. In this embodiment non-SIMD instructions are controlled by bit 0 of the designated predicate register and therefore the entire non-SIMD operation is executed in dependence on whether or not that bit is TRUE or FALSE.

Figure 5A:
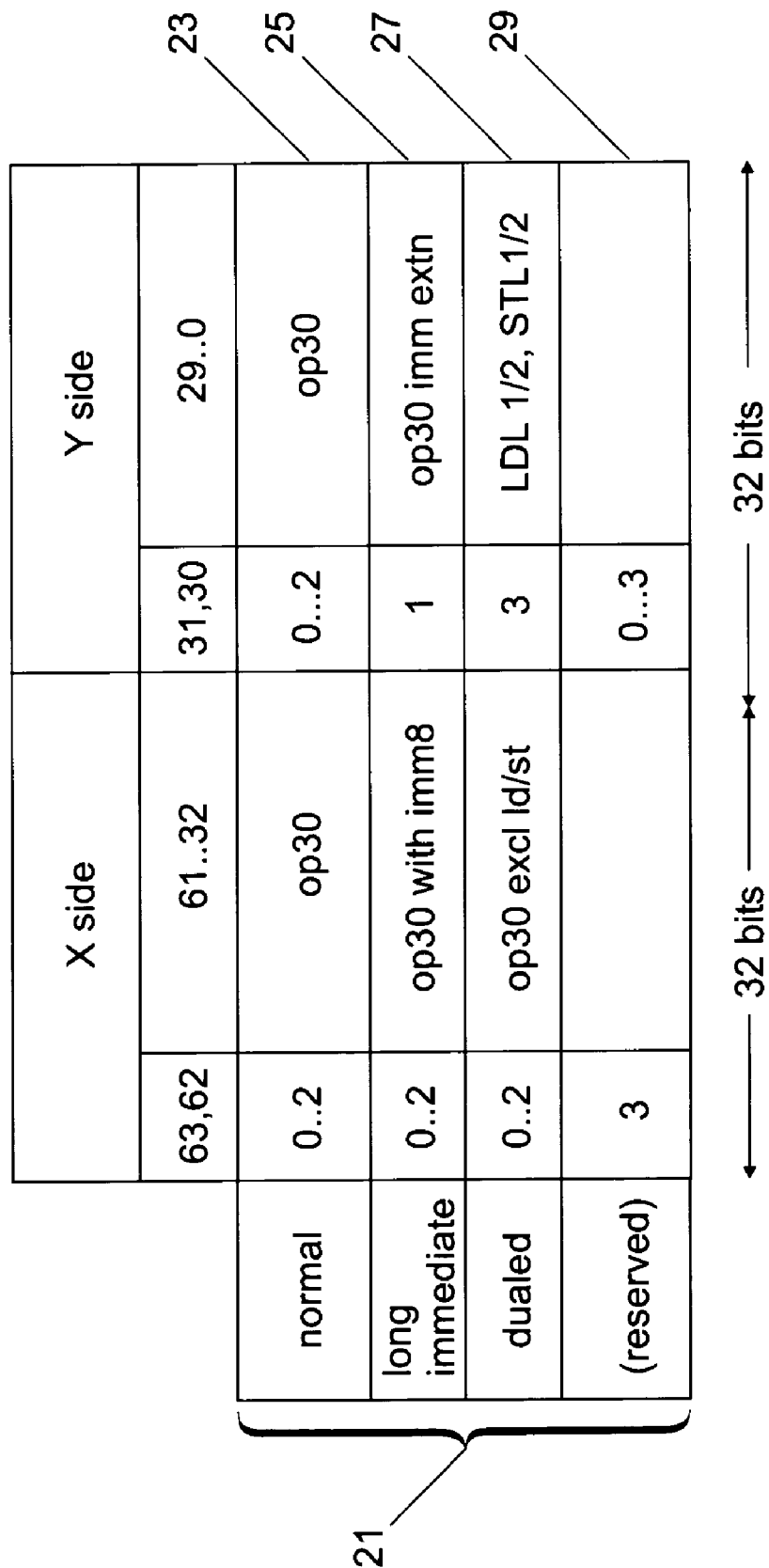
FIG. 5A illustrates a plurality of 64 bit instruction formats employed in the computer system of FIG. 1.

FIGS. 5A and 5B show specific examples of instruction types used with the computer system of FIG. 1. The instruction types use 64 bit long instruction words.

Referring to FIG. 5A, a long instruction word 21 comprises an X side 32 bit instruction portion and a Y side 32 bit instruction portion packed into a single 64 bit instruction. The X and Y side operations are generally independent, although registers may be shared. An opcode major field comprises the first two bits of each instruction portion (i.e. bits 63, 62; 31, 30). The opcode major field in combination with the opcode field defines the type of operation to be performed. Each 32 bit instruction portion may take any of the 32 bit formats discussed with reference to FIG. 5B and may define a single operation or two separate operations. With a normal instruction 23, the X side opcode major field defined by bits 63, 62 takes a value from 0–2, with bits 61–32 available as an X side opcode field. Likewise, the Y side opcode major field defined by bits 31, 30 takes a value from 0–2, with bits 29–0 available as a Y side opcode field. Different types of X and Y side operations may be freely mixed (ie used in any combination). Thus, in the case of normal instructions these opcode major fields take values from 0–2, with the value of 3 being reserved for special operations.

This embodiment also supports a long immediate instruction 25 in which a 32 bit immediate value is defined by bits in both the X and Y side portions of the instruction. The X side of the instruction defines the beginning of the long immediate value and the Y side of the instruction carries the extra bits to make up the long immediate value. The X side opcode major field defined by bits 63, 62 takes a value 0–2 and opcode bits 61–32 define a first operand together with a first 8 bit portion of the long immediate value. The Y side opcode major field defined by bits 31, 30 takes a value of 1 and the opcode bits 29–0 contain the additional 24 bits required to specify a 32 bit immediate value. Long immediate instructions are thus 64 bit instructions which allow most of the Register/Immediate ALU operations to be performed using a 32 bit immediate value. Long immediate instructions are performed on the X side of the machine while the Y side of the machine is redundant.

A data processing operation may be combined with a load store operation. The data processing operation is defined in the X side instruction portion (bits 63–32) and the load/store operation is defined in the Y side instruction portion (bits 31–0). According to a special case, dualable load/store operations 27 allow movement of 128 bit values into and out of consecutive (paired) 64 bit registers and may be combined with dual execute operations (e.g. ALU2 or MAC2 operations) which act on all operands held in the paired registers at the same time. Dual execute operations use even/odd pairs of registers for the two source registers and the destination register and execute on both the X and Y sides of the machine simultaneously. The X side opcode major field (defined by bits 63, 62) take a value of 0–2 and the X side opcode bits 61–32 define an operation (for example, an ALU or ALU2 operation). The load/store operation is defined by the opcode major field (bits 31, 30) which takes a value of 3 and opcode bits 29–0. The load/store operation runs on the Y side of the machine.

Operations based on normal instructions, long immediate instructions and dual execute instructions are examples of operations which may be performed conditionally under the control of predicate registers.

Another long instruction format 29 using an X side instruction portion having an opcode major field of 3 and Y side opcode major bits taking a value of 0–3 is reserved for special functions not defined herein.

FIG. 5B shows examples of 32 bit instruction formats which this embodiment uses to define the or each operation in the long instruction word. In each case an optional predicate register field (Psrc) indicates which of the eight predicate registers controls per lane execution of the operation defined in the instruction. In general, all src/link fields designate general purpose registers. The dest field may designate a general purpose, MAC or predicate register. Src and dest fields may designate general purpose register pairs.

Register/Register instructions 22a provide a full set of SIMD data processing operations. Operands are taken from first and second source registers and the result is allocated to one or more destination registers. Register/Register 32 bit instruction formats 22a include a controlling predicate field (Psrc, bits 0–2), a destination register field (Gdest, bits 3–8) and two source register fields (Gsrc1, bits 9–14; and Gsrc 2, bits 15–20) and an opcode major field taking a zero value (bits 31, 30). The remaining bits are available as opcode bits to define the operation. In general the Gdest field designates a general purpose register. For compare/test operations the Gdest field indicates a predicate register to be written to as will be illustrated later. For MAC operations the Gdest field designates a MAC-register.

Register/Immediate instructions 22b provide a set of SIMD data processing operations using as operands the contents of a source register and a (replicated) immediate value. The result is placed in another register. To perform this type of operation the second source register is replaced with an 8 bit immediate value Imm8. Thus, Register/Immediate instructions 22b include a controlling predicate field (Psrc, bits 0–2), a destination register field (Gdest, bits 3–8), a source register field (Gsrc1, bits 9–14), an immediate field (bits 15–22) and an opcode major field taking a value of 1 (bit 31, 30), with remaining bits available to define the operation. The immediate field is an 8 bit value representing a number between 0–255. Immediate values are extended by zeros to the lane size of the SIMD operation (B, H, W, L) and then replicated across each of the SIMD lanes.

As mentioned with reference to FIG. 5A long immediate instructions are 64 bit instructions allowing register/immediate operations to be performed with 32 bit immediate values. Long immediate instructions are run on the X side of the machine. A 24 bit immediate extension is needed on the Y side of the machine. An example of a 32 bit instruction portion indicating a 24 bit immediate extension value is designated by reference numeral 22c. Instruction portions carrying 24 bit immediate extensions have an opcode major field taking a value of 1 (bits 31, 30).

Thus, it will be apparent that in 32 bit data processing instruction formats 2 bits are used in the opcode major field, 6 bits are used in each register field to indicate source and/or destination registers, 3 bits are used in a predicate field to indicate which, if any, of the eight predicate registers should control conditional execution per lane. The remaining opcode field bits are generally used to provide information on the type of operation, which information is decoded taking into account the values in the X and Y side opcode major fields. Where 8 bit or 32 bit immediate values are specified in instructions additional bits are required. That is, two further bits are required to specify an 8 bit immediate value and a total of 26 further bits are required to specify a 32-bit immediate value.

The instruction formats 22d, 22e and 22f specify load/store operations employing a range of standard addressing modes. According to this embodiment, loads fetch a single value, i.e. a byte, half word, word or a long word from memory into a register. Where a small value is loaded, the value is loaded into the bottom of the register in question. Where a full 64 bit register has been loaded the value may be treated as a single long word, as two words, four half words or eight bytes. Store operations write a single value, i.e. a byte, half word, word or a long word from a register to memory. Where a value is smaller than a register being used, the bottom part of the register is used. Where a full 64 bit value is stored, the contents can be treated as a single long word, two words, four half words, or eight bytes. Even and oddly addressed register pairs are provided to accommodate double long word (i.e. 128 bit) load/store operations.

Referring specifically to the 32 bit instruction format 22d load/store register/register operations move register data between a register Gdata and memory. The instruction format 22d includes a controlling predicate field Psrc (bits 0–2), a base register field Gbase (bits 3–8), a data register field Gdata (bits 9–14), an index field Gsrc2 (index)(bits 15–20), a scale field scale (bits 21, 22), a word indicator field $W_{1/10}$ (bit 23), a write back indicator field $W_b$ (bit 24) and an opcode major field (bits 30, 31) taking a value of 0.

Referring to the 32 bit instruction format 22e load/store register/offset operations permit load/store operations with data locations defined by an offset coded as a 9 bit twos complement value. This instruction format has some fields in common with the instruction format 22d and these fields have the same definitions here. Load/store register/offset instructions include a 9-bit immediate value Imm 9 (bits 15–23) used to specify an offset in place of the index value register field. Also included is an "address modify" indicator field am (bit 25) and an opcode major field (bits 30, 31) taking a value of 2.

The 32 bit instruction format 22f illustrates the special class of dualable load/store operations which may be placed on the Y side of the machine at the same time as a data processing operation is placed on the X side of the machine. A dualable load/store instruction includes a type field Id (bit 27) specifying either a load or a store function, a Y side dual indicator field Is2 (bit 28) controlling whether the contents of one or two registers should be transferred in the load store operation, an X side dual indicator field ps2 (bit 29) controlling whether or not the X side data processing operation is to be mirrored on the Y-side, and an opcode major field taking a value of 3.

Where the load/store operation is dualled two memory addresses are generated. For example, the bit sequence representing an offset would be supplied from the original Y side instruction portion to both the X and Y side load/store units. In this embodiment, the path to the Y side load/store unit supplies the offset unaltered to the Y side load/store unit, whereas the path to the X side load/store unit includes a unitary operator which selectively alters the logical value of at least one bit in the offset bit sequence such that a different memory address is accessed by the X side. When an X side data processing operation is mirrored on the Y side, the various fields of the data processing instruction are additionally transferred to the relevant unit on the Y side with relevant values thereof having been adjusted as necessary. For example, where the X side data processing operation is mirrored on the Y side, "even" source and destination register addresses are supplied to the relevant functional unit on the X side, whereas corresponding "odd" register addresses are supplied to the functional unit on the Y side.

The above-described load/store instruction formats can define load/store instructions using six standard addressing modes. These addressing modes are illustrated in Table 1.

TABLE 1

| | Semantics | Function |
|---|---|---|
| 1 | [<rbase>, <reg>, {W₀/W₁} {<<shift}] | base + scaled pre-indexed |
| 2 | [<rbase>, <reg>, {W₀/W₁} {<<shift}]! | base + scaled pre-indexed with write back |
| 3 | [<rbase>, # <offset>] | base + offset pre-indexed |
| 4 | [<rbase>, # <offset>] | base + offset scaled pre-indexed |
| 5 | [<rbase>, # <offset>]! | base + offset pre-indexed with write back |
| 6 | [<rbase>, # <offset>]! | base + offset post-indexed with write back |

In TABLE 1, < > denotes a mandatory field, { } denotes an optional field and / delimits a list of choices. Where { W₀/W₁ } is present but not specified the default is W₀. Scale values may be <<1, <<2, or <<3.

A first type of addressing mode (1) uses a base register plus a scaled register pre-indexed addressing mode. According to this mode the address is the unsigned 64 bit contents of the base register plus the signed 32 bit contents of the index register, optionally shifted by the shift amount.

A second type of addressing mode (2) employs a base register plus scaled register pre-indexed address mode with a write back function. According to this mode the address is the unsigned 64 bit contents of the base register plus the signed 32 bit contents of the index register, optionally shifted by a shift amount. The value generated is then written back to the base register.

A third type of addressing mode (3) uses a base register and an immediate offset (pre-indexed). According to this mode the address is the unsigned 64 bit contents of the base register plus an immediate offset. The immediate offset can of course be a positive or negative value.

A fourth type of addressing mode (4) uses a base register and an immediate offset scaled to long words (pre-indexed). In this case the address is the unsigned 64 bit contents of the base register plus the immediate offset scaled to long words. The assembler works out which of the two address forms is required, for example using the non-scaled form.

A fifth type of addressing mode (5) uses a base register and an immediate offset (pre-indexed) with a write back function. The address is the unsigned 64 bit contents of the base register plus the immediate offset and is written back to the base register.

A sixth type of addressing mode (6) uses a base register and an immediate offset (post-indexed) with a write back function. In this case, the address is the unsigned 64 bit contents of the base register. However, the value of the base register plus the immediate offset is computed and written back to the base register.

The instruction formats 22g and 22h of FIG. 5B specify branch operations which in this embodiment may only be issued on the X side of the machine. The machine can perform long and short branches. Branch instructions to be executed conditionally test the TRUE/FALSE values of bits in predicate registers designated in the Psrc field of the instructions. Long and short instructions are used to implement conditional branches.

The 32 bit instruction format 22g is a short instruction format defining the branch target address by means of a value held in a register. Such register values represent a way to change the program counter to an absolute value, to a value from a call saved in a link register or on a stack or to a calculated value. The instruction format has an opcode major field taking a value of zero. The Gsrc field, (defined by bits 15–20) designates the register holding the branch target address information. The instruction includes an optional predicate register field Psrc (bits 0–2) which indicates the predicate register to be accessed in order to establish whether or not to take the branch. The link register field Gdest (bits 3–8) defines a register for saving the current program count. If a link register field designates the zero register the program count is in effect discarded. The P-bit field (bits 12–14) is an optional field indicating a specific bit in the designated predicate register. This field is used in branch operations performed conditionally in dependence on the state of a single bit TRUE/FALSE value within a predicate register. The hint field (bit 24) indicates whether or not a branch is likely to be taken. Enabling a programmer to set this field removes the need to store large quantities of history information in order to predict likelihoods.

The 32 bit instruction format 22h may be used to define another type of short branch instruction. This instruction format has an opcode major field of 1. This instruction format has a number of fields in common with the instruction format 22g. These common fields serve corresponding purposes and are not discussed again here. An offset is used to define the branch target address. The Imm9 field (bits 15–23) specifies the offset in the form of a 9 bit immediate value.

Where an offset is defined by an immediate value, an immediate extension field may be used to extend the 9 bit immediate value to a 32 bit immediate value. This is achieved by combining instruction format 22h with the instruction format 22c to generate a long branch instruction defined by a 64 bit instruction word. Short branch instructions may be performed in parallel with other instructions, whereas long branch instructions cannot. For an immediate offset, a value of 0 causes the execution unit to move to the next instruction and a value of 1 causes a branch to the next but one instruction. The total range of a long branch instruction is −2147483648 instructions to +2147483647 instructions. The range of short branch instructions is −256 instructions to +255 instructions.

The full instruction set will depend on the application. For example, the instruction set is generally capable of executing standard computer languages (such as C, C++ and Java) but is primarily designed for special purpose functions employed in, for example, encoding/decoding communication signals, video processing (e.g. compression, decompression and filtering signals), three-dimensional graphics, image processing, compressing and decompressing moving images and sound, performing voice and/or image recognition functions. A skilled person would readily appreciate that to achieve efficient implementation over a variety of applications it may be necessary for the binary code to differ from one embodiment to another. However where desired, it is possible for different implementations to be compatible at assembly language level and higher levels.

Figure 6A:
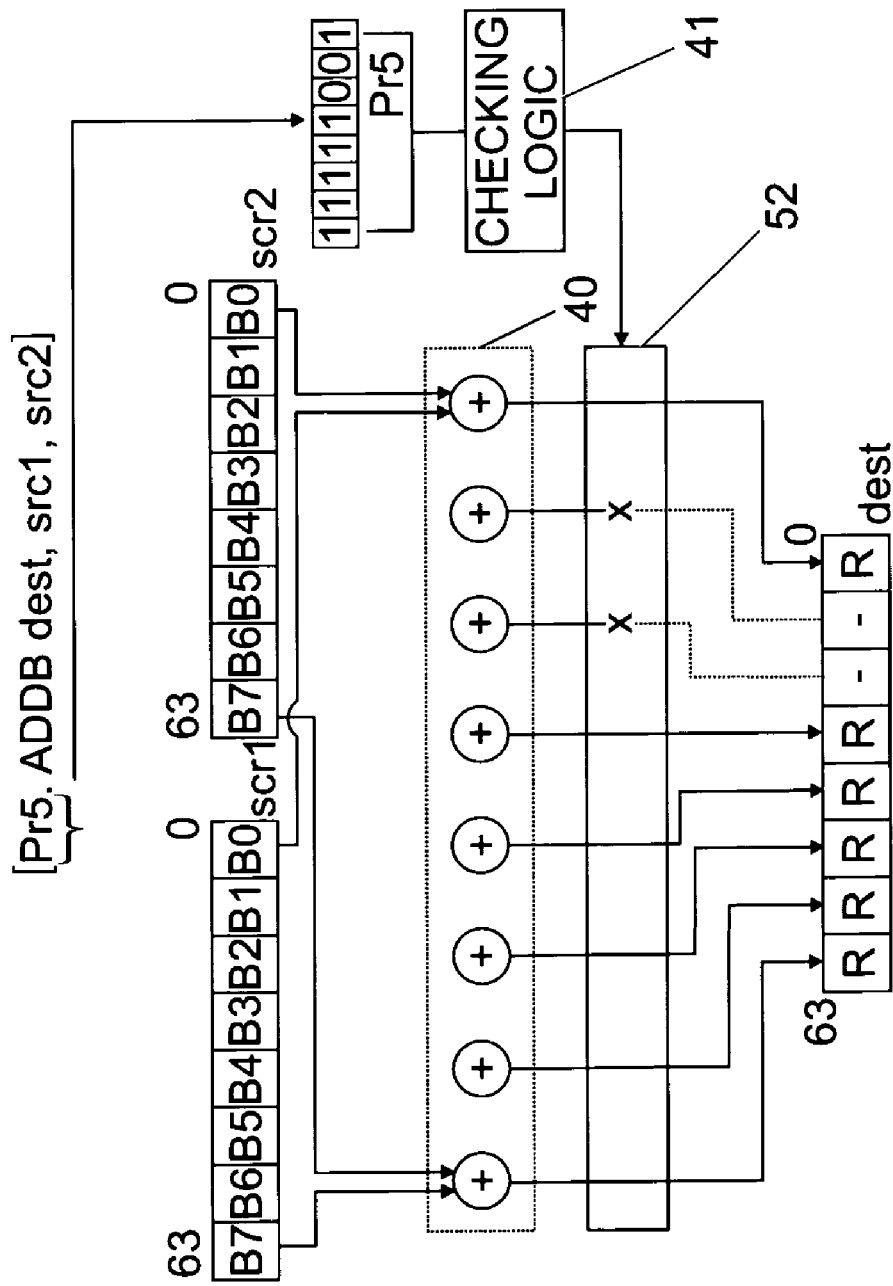
FIG. 6A is a block diagram illustrating components of the computer system of FIG. 1 performing a first conditional execution operation.
Figure 6B:
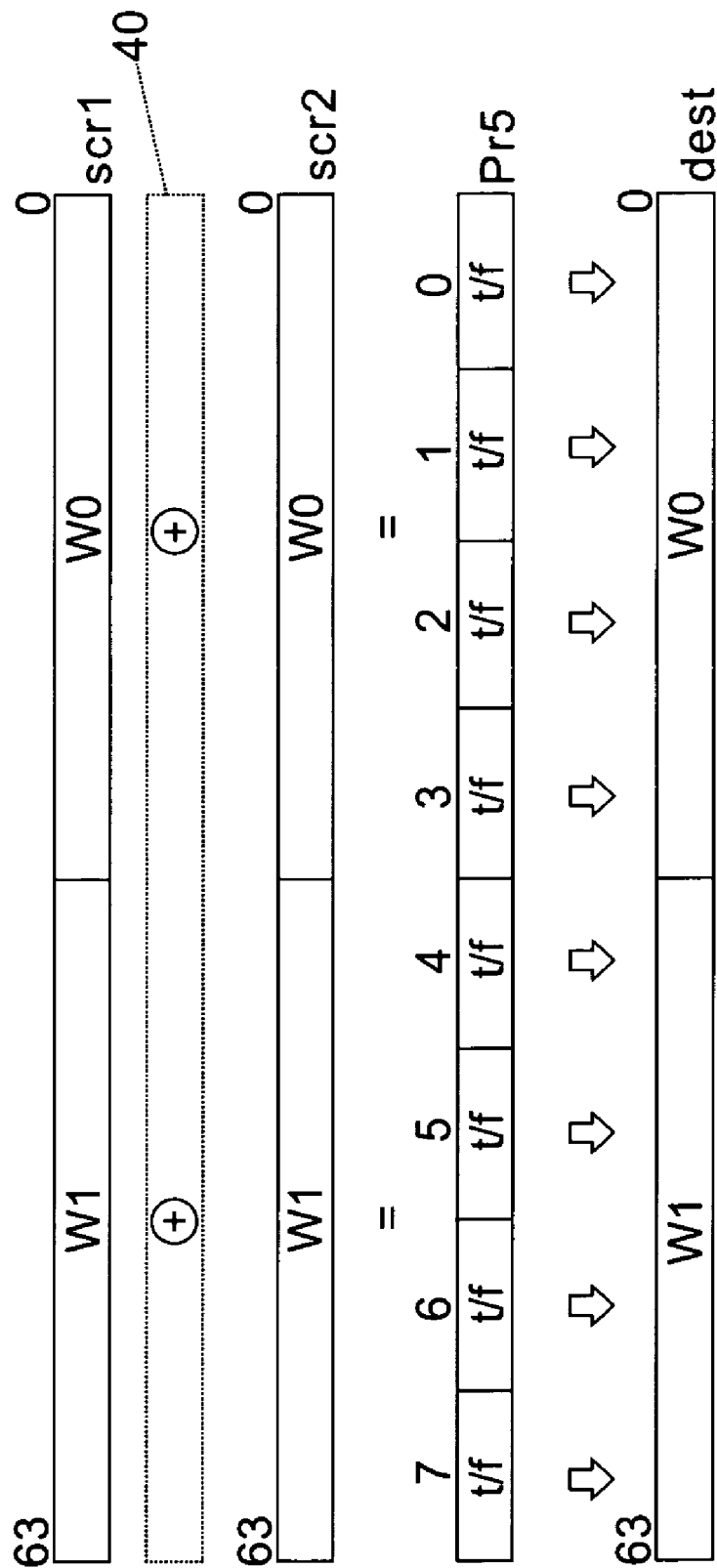
FIG. 6B illustrates a further conditional execution operation which may be performed by the computer system of FIG. 1.

FIGS. 6A and 6B illustrate how operations sending results to a single destination register may be performed conditionally on individual SIMD lanes irrespective of the lane size. FIG. 6A is an example of byte level conditional execution and FIG. 6B is an example of word level conditional execution. For clarity, the predicate registers illustrated schematically in FIGS. 6A and 6B are shown enlarged such that individual bits of the predicate registers are comparable in size to byte lanes of the operands.

In detail, FIG. 6A shows per lane conditional execution of a SIMD ADDB instruction which treats the register data as eight separate bytes of information. In this example, the ADDB data processing instruction has the following semantics: {Psrc}.ADDB dest, src1, src2. Thus, the instruction specifies a first 64 bit source register src1, a second 64-bit source register src2 and a destination register dest. The optional Psrc field specifies a predicate register to control conditional execution of each of the SIMD lanes. Each source register src1, src2 contains a plurality of byte sized operands for the addition operation and the destination register dest is for holding the results. The Psrc field indicates the predicate register pr5 as the controlling predicate register for the operation. Only the controlling predicate register is shown. The ADDB operation is executed conditionally on a per lane SIMD lane basis at byte level under the control of judiciously set TRUE/FALSE values of the corresponding bits 0–7 of the predicate register. Respective corresponding byte sized objects are supplied from the source registers scr1, src2 to the addition circuitry 40. The addition circuitry 40 contains a plurality of operators which perform addition operations on the first and second source objects of each SIMD lane. Predicate checking logic 41 checks the state of each bit of the designated predicate register pr5. An output from predicate checking logic controls a set of switches 52, one for each byte lane $B_0$–$B_7$. These switches control whether or not the results of the addition operation are written to the corresponding byte lane of the dest register. Where the predicate bit is set TRUE, a switch of the switch array 52 allows the result for the corresponding byte lane to be written to the destination register. Where a predicate bit is set FALSE, a switch of the switch array 52 does not allow the results for the corresponding byte lane to be written to the destination register. Since in this example bits 0, 3, 4, 5, 6 and 7 are TRUE only the results for byte lanes $B_0$, $B_3$, $B_4$, $B_5$, $B_6$, $B_7$ are written to the destination register. The results for byte lanes $B_1$ and $B_2$ are not written to the destination register since predicate bits 1 and 2 are FALSE, as illustrated by the crosses on FIG. 6A.

FIG. 6B is a simplified schematic illustration omitting apparatus features. In this example an ADDW instruction specifies that register data should be treated as words and the operation is performed at word level. The word sized operands are supplied from two 64 bit registers src1, src2 to addition circuitry 40. Predication is performed in the same way as before (i.e. at byte level) with bits 0–3 of the predicate register controlling conditional execution of the first word lane $W_0$ and bits 4–7 of the predicate register controlling conditional execution of the second word lane $W_1$. The word sized result objects are sent to the destination register dest.

Thus, using the above-described predication technique operations can be performed conditionally on packed objects of any predetermined size. It will be apparent that the predicate bits can be set in advance of the operation to be conditionally executed. They can be set such that where appropriate a predetermined number of adjacent predicate bits are set to similar states. Operations defined in the instruction formats are carried out on each "lane" of the operand, that is on each pair of corresponding packed objects in respective source registers src1, src2 or source register and immediate value as the case may be.

When instructions define operations which cause results to be sent to two destination registers, conditional execution can be performed by more than one mechanism. A first mechanism uses a single predicate register to control the SIMD lanes to both destination registers. This conditional execution mechanism is useful when operations employ a single source register to generate a double sized result. An example of such an operation is an SIMD multiply operation and a specific type of multiply operation is used to explain this mechanism in detail hereinafter. This mechanism is also useful in controlling conditional execution of data manipulation operations, such as dealing data from source registers to destination registers according to control words. In fact, it is useful in many scenarios in which result objects exceed the size of the source objects.

A second mechanism for controlling conditional SIMD execution of operations sending results to two destination register uses a pair of independently addressable predicate registers, each controlling the SIMD lanes to a different one of the destination registers. This type of conditional execution mechanism is useful for example in the predication of dualed operations involving a total of 128 bits of information.

These first and second conditional execution mechanisms for sending results to two destination registers are explained in more detail below with reference to FIGS. 7A and 7B respectively.

Figure 7A:
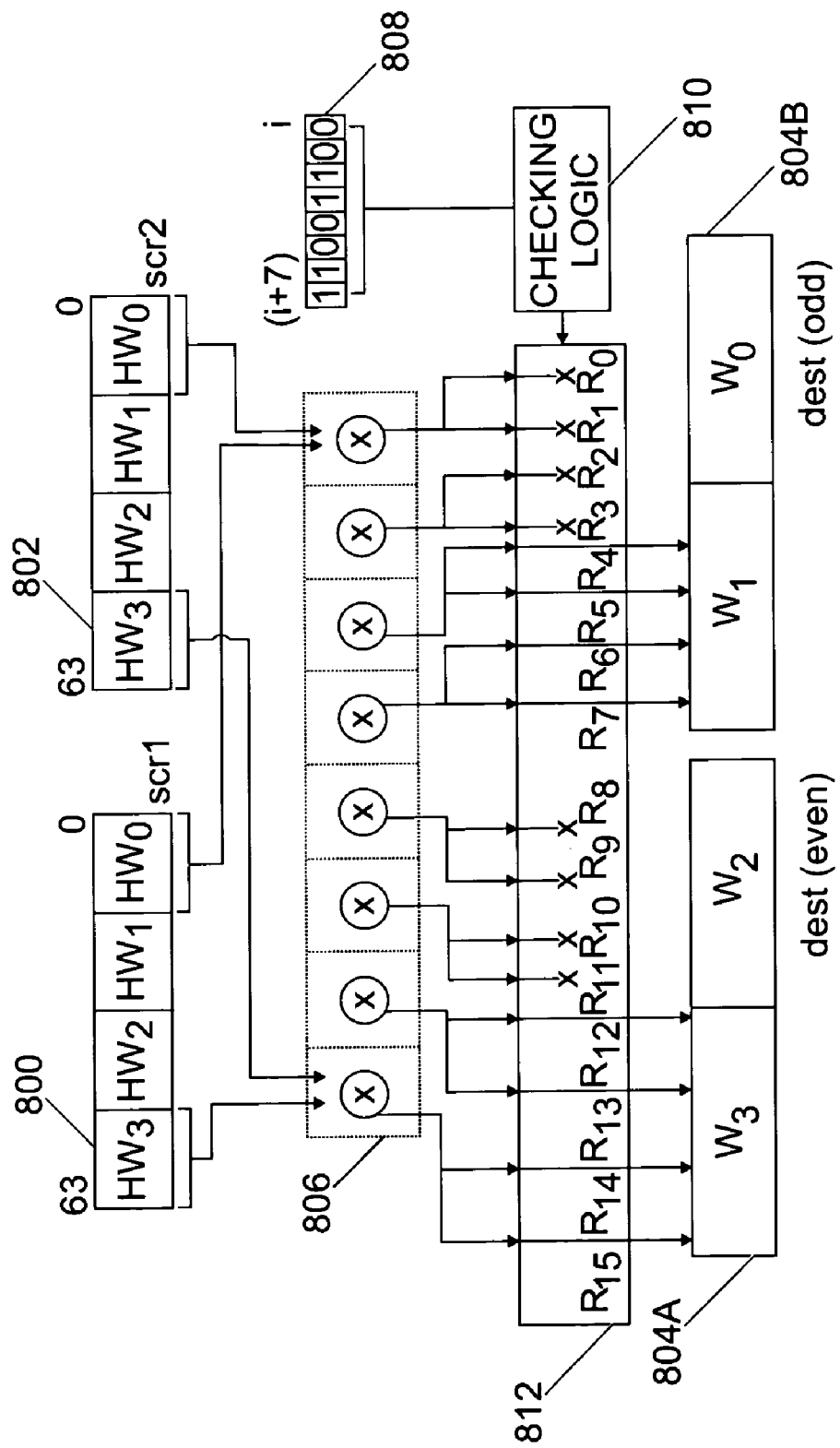
FIG. 7A is a block diagram of components of the computer system of FIG. 1 performing a third conditional execution operation.

FIG. 7A shows by way of example SIMD per lane conditional execution of an MULUUHW instruction by means of the first mechanism. According to this instruction, unsigned half words are multiplied to produce words. In practice, the computer multiplies the unsigned contents of a source register with the unsigned contents of another source register and sends the results to a pair of destination registers. The instruction has the following semantics:

{Psrc}.MULUUHW dest(pair), src1, src2.

Where the Psrc field designates a predicate register, the MULUUHW field is an opcode field designating the type of instruction and the SIMD lane size, the dest (pair) field designates a pair of destination registers for holding results and the src1 and src2 fields designate first and second source registers holding operands for the operations. Suitable code for such an operation might read as follows:

```
FORALL i IN 0 . . . 3
    TemPair_Word(i) :=Src1_UnsignedHalf(i) * Src2_UnsignedHalf(i)
ENDFOR
FORALL i IN 0 . . . 15
    IF Preg BIT (i/2) THEN
        DestPair_Byte (i) : Tempair_Byte(i)
    ENDIF
ENDFOR
```

The 8 bit predicate register designated in the instruction controls each of the four double sized result lanes substantially as it would normally control result lanes corresponding to the operand lane size. Each source register 800, 802 contains a plurality of half word sized objects $HW_0$ . . . $HW_3$ for multiplication operations. The destination register pair 804A, 804B is a pair of independently addressable 64 bit registers for holding the word sized result $W_0$ . . . $W_3$. The multiplication circuit 806 is provided to perform SIMD multiplication operations for varying lane sizes and can be implemented, for example, by means of adder circuitry. In this embodiment, the registers of the destination register pair have even and odd values of a corresponding address in order to facilitate easy designation of register pairs in instruction formats. Only the controlling predicate register 808 is shown. Predicate checking logic 810 controls an array of switches 812. These switches control whether or not the results of the operation are written to the destination registers on a per byte lane basis. Independent bits of the predicate register are set so as to be compatible with the SIMD lane size designated in the instructions.

The MULUUHW operation is performed conditionally on a per SIMD lane basis under the control of respective predicate bits of the designated predicate register. Half word sized objects $HW_0$ . . . $HW_3$ of corresponding logical weights are supplied to respective inputs of the multiplication circuitry 806 from different source registers 800, 802. The predicate setting logic 810 checks single bit flags in the predicate register in order to control adjacent pluralities of switches in the switching array 812. Each half word operand generates a word sized result and so each single bit flag i in the predicate register controls the results of two adjacent result lanes $R_i$, $R_{i+1}$.

Hence, predicate bits i and (i+1) respectively control result lanes $R_0$, $R_1$ and $R_2$, $R_3$ which in combination control the writing of the word sized result $W_0$. Predicate bits (i+2) and (i+3) control the result lanes $R_4$, $R_5$ and $R_6$, $R_7$ which in combination control writing of the word sized object $W_1$. Predicate bits (i+4) and (i+5) respectively control the first and second result lanes $R_8$, $R_9$ and $R_{10}$, $R_{11}$ which in combination control the writing of word sized result $W_2$. Finally, the predicate bits (i+6) and (i+7) respectively control the result lanes $R_{12}$, $R_{13}$ and $R_{14}$, $R_{15}$ which in combination control the writing of the word sized result $W_3$. Thus, an SIMD operation sending results to a plurality of independently addressable destination registers is predicated by a single predicate register with each predicate bit controlling a predetermined plurality of result lanes which are in this example adjacent to one another. In different operations a predicate bit can control a different predetermined number of result lanes in a similar manner.

Figure 7B:
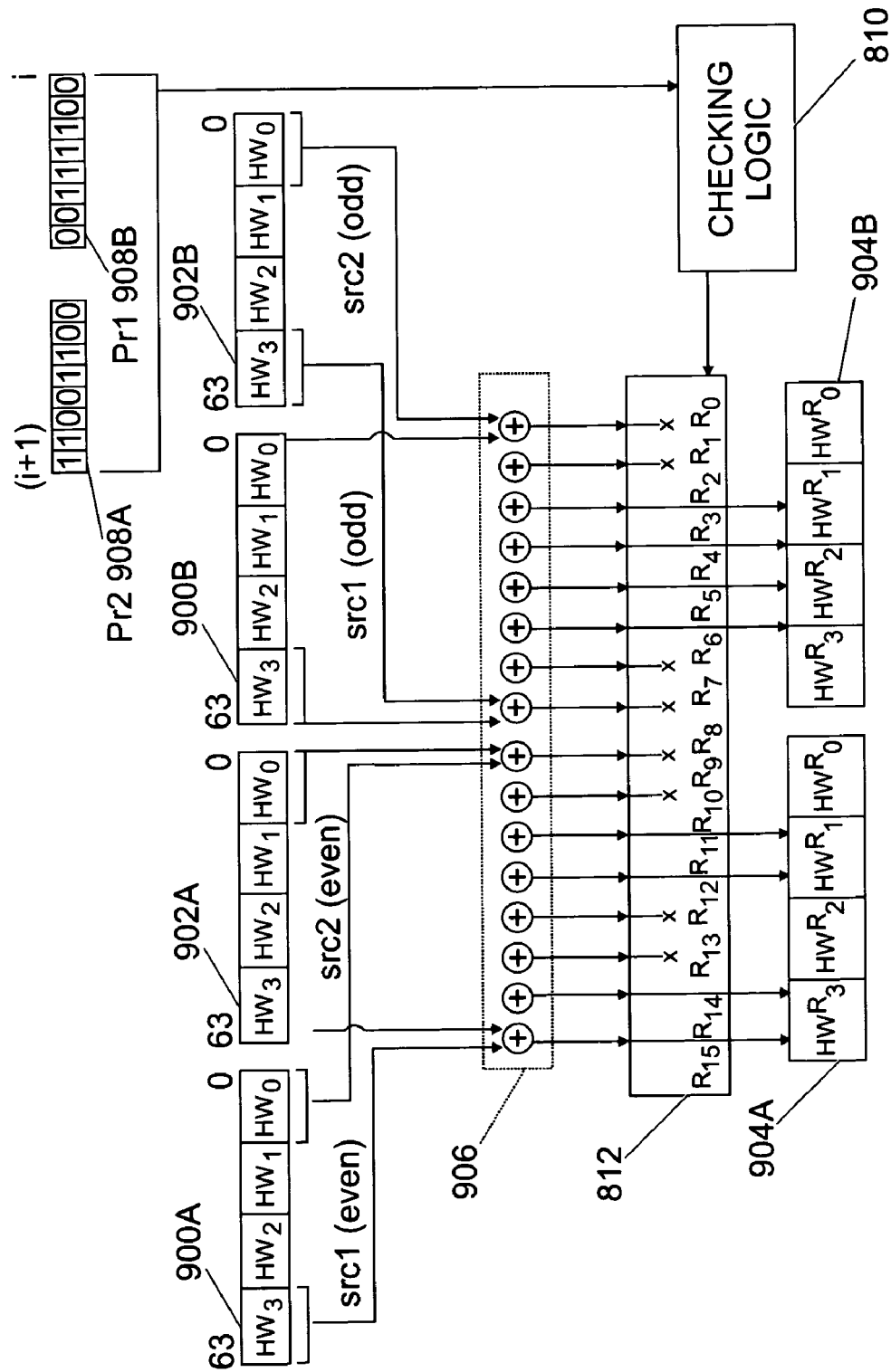
FIG. 7B is a diagram of components of the computer system of FIG. 1 performing a fourth conditional execution operation.

FIG. 7B shows SIMD per lane conditional execution of an ADD2H instruction by means of the second above-mentioned technique. According to the dualed ADD2H instruction respective operands from a first source register pair are added to operands held in a second source register pair and the results are sent to a pair of destination registers. The instruction has the following semantics:

{Psrc(pair)}.ADD2H dest (pair), src1 (pair), src2 (pair).

Where in addition to the operation type and lane size designation, the instruction specifies a first pair of 64 bit source registers having even and odd versions of a corresponding address, a second pair of even/odd 64 bit source registers, and a pair of even/odd destination registers. The (optional) Psrc (pair) field specifies first and second predicate registers to control the SIMD lanes of parallel operations. The predicate registers may have even/odd values of the same address to facilitate easy designation in instruction formats. In this example the size of the result objects corresponds to that of the operand objects.

The two sets of 64 bit source registers 900A, 902A; 900B, 902B hold half word sized operands $HW_0 \ldots HW_3$ for use in two parallel addition operations. The destination register pair 904A, 904B is a pair of independently addressable 64 bit registers for receiving the half word sized results $HW^R_0 \ldots HW^R_3$. This time the predicate checking logic 801 is connected to access two predicate registers 908A, 908B simultaneously. The predicate checking logic 810 controls the switching array 812 such that independent byte size result lanes $R_0 \ldots R_{15}$ are executed based on the state of respective single bit flags in both predicate registers.

Thus, two ADD halfword operations are performed contemporaneously and with per SIMD lane conditional execution. In the first ADD operation half word sized objects of corresponding logical weights are supplied to respective inputs of the addition circuitry 906 from first and second evenly addressed source registers 900A, 902A. The predicate checking logic 810 checks individual flags in the predicate register 908A and controls adjacent pluralities of switches in the switching array 812 in dependence on the state of the predicate bits. Each half word operand generates a similar sized result and each bit i of the predicate register controls a single byte wide result lane $R_i$.

In the second of the dualed addition operations, half word sized objects of corresponding logical weights are supplied to further respective inputs of the addition circuitry 906 from third and fourth odd-addressed source registers 900B, 902B. The predicate checking logic 810 checks the individual flags of the predicate register 908B and controls the plurality of switches in the switching array according to the state of the predicate bits.

Thus in this example, respective predicate bits i ... (i+15) spread across two designated predicate registers 908A, 908B each control corresponding respective result lanes $R_0 \ldots R_{15}$. Each predicate bit controls a single byte sized result lane. A skilled person will appreciate that it is possible for the controlling predicate bits to be spread across more than two predicate registers.

When the X-side of the instruction defines a data processing operation and the Y-side defines a load/store operation both the X and Y-side operations can be dualed. For example consider X and Y side instruction portions providing the following information:

pr0/pr1.MAC2 dest0/dest1, src0/src1, src2/src3: pr6.LDL2 dest2/dest3 [src4]#16!

On the X-side, the MAC pipe is presented with the values of the predicate register pr0 and source registers src0 and src2. The results are sent to the MAC register dest0. The X-side load/store pipe is presented with the values of the predicate register pr6 and the source register src4 plus a predetermined value (in this example 8). The data is loaded into the destination register dest3. At the same time, the Y-side MAC pipe is presented with the values of the predicate register pr1 and the source registers src1 and src3. The results are placed in the MAC register dest1. The Y-side load/store pipe is presented with the values of the predicate register pr6 and the source register src4. The data is scheduled to be loaded into the register dest2. There is no need in this embodiment for predicate or other register values to be transferred from one execution channel to another because the values are accessed directly from the relevant side. The computer system thus initiates processing on both execution channels at the same time. Operations running for different lengths of time can therefore finish at different times.

Setting operations can be used to set bits of the predicate registers in dependence on predetermined test conditions. Predicate setting instructions have the following general form:

{Psrc}.SETOP TSTID B/H/W Pr$, src1, src2

The {Psrc} field is an optional field which may be used to designate a controlling predicate register if the predicate setting operation is to be predicated. The SETOP field specifies the type of operation which will be used to set the predicate register. For example, the TRUE/FALSE values of the bits in predicate registers can be set by a specific integer arithmetic comparison operation (CMP), a boolean bit test operation (TST) or a floating point comparison operation (FCMP). The TSTID field indicates the test to be performed. For example, in the case of compare operations an arithmetic test is specified in this bit sequence, for boolean test operations a logical test is specified and for floating operations a floating point test is specified. The Pr$ field designates one of the eight predicate registers to be set. The src1 and src2 fields specify first and second source registers for the predicate setting operation. Thus, instructions defining predicate setting operations do not have a destination field as such. The 6 bits used to specify a destination register for data processing operations, namely the Gdest field of instruction formats 22a and 22b (see FIG. 5B) are used differently. The TSTID and Pr$ fields each require 3 bits and occupy a bit sequence equivalent in size to the destination register field of a data processing operation. In this embodiment, the indication of lane size B/H/W/L is encoded as part of the opcode field. In other embodiments, different encoding schemes may be used. For example, it would be equally feasible to design a binary encoding scheme with a special 2 bit field carrying this information.

A class of ORSET tests set the destination predicate register only if the result is TRUE. For example, a "compareOR" operation sets predicate register bits only if the result of a compare operation is TRUE. That is, a positive result sets to TRUE and a negative result gives no change. This is achieved by predicating the writing of the value in the destination register with the value itself. The instruction CMPORLEB, Pr1, src1, src2 provides an OR test applied between the old Pr1 bit value and the result of the comparison operation src1≦src2. Thus, overall a Pr1 bit value is set TRUE if either the old OR the new result is TRUE. Again, the assembler language may use synonyms for related types of operation (e.g. CMPOR, TSTOR, FCMPOR).

Table 2 illustrates SETOP and TSTID fields for various types of predicate setting operation.

TABLE 2

| SETOP | TSTID | FUNCTION | EXAMPLE |
|---|---|---|---|
| CMP | GT | Signed greater than | e.g. CMPGT |
|  | HI | Unsigned higher than |  |
|  | LE | Signed less than or equal |  |
|  | LS | Unsigned lower than or same |  |
| FCMP | EQ | Equal | e.g. FCMPGT |
|  | NE | Not equal |  |
|  | GE | Greater than or equal |  |
|  | GT | Greater than |  |
|  | LE | Less than or equal |  |
|  | LT | Less than |  |
|  | NF | Infinity of NaN |  |
|  | UN | Unordered |  |
| TST | EQ | Equal | e.g. TSTNE |
|  | NE | Not equal |  |
|  | ZE | Zero (for bitwise AND) |  |
|  | NZ | Not zero (for bitwise AND) |  |
|  | BC | Bit clear |  |
|  | BS | Bit set (dyadic by bit number) |  |

Typically the SETOP and TSTID fields are combined in a single large field.

CMPOR type operations can employ the same tests as the CMP type operations. FCMPOR type operations can use any test indicated for FCMP operations. TSTOR operations can use the same tests as TST operations.

Predicate setting operations thus set respective bits of the predicate register designated in the instruction in dependence on the result of the test on each byte lane. As mentioned herein before, destination register field indicates which of the predicate registers is to be set. Byte level tests set respective individual bits in the designated predicate register to the result on each byte lane. Half word tests set adjacent bit pairs in the designated predicate register to the result of the test on each half word lane. Likewise, word level tests set groups of four adjacent bits in the designated predicate register to the result of the test on each word lane and long word tests set all eight bits in a predicate register to the result of the long word test.

FIG. 8A illustrates how a comparison operation, such as a specific integer arithmetic comparison on byte sized packed objects (CMPLTB) can be used to set individual TRUE/FALSE values in a predicate register. An instruction format based on the Register/Register instruction format designated by referenced numeral 22a of FIG. 5B is used to define this compare operation. The "compare less than" instruction has the following semantics: {Psrc}.CMPLT{B/H/W} dest, src1, src2. The first and second source fields src1, src2 specify registers holding values to be compared in the operation and the destination register field dest indicates a predicate register to which the results are to be written. The Psrc field is an optional field used to indicate a controlling predicate register. In this example, the instruction CMPLTB Pr1, src1, src2 compares byte sized packed objects held in the first source register src1 with corresponding byte sized packed objects in the second source register src2 to test on a per lane $B_0$–$B_7$ basis whether values in src1 are less than corresponding src2 values. The test result for each lane is written to the corresponding bit position 0–7 in the predicate register pr1. That is, for each lane the corresponding bit in the predicate register pr1 is set TRUE (1) if the less than test applies and FALSE (0) otherwise. In this example, the less than test is positive for byte lanes $B_0$, $B_1$, $B_2$, $B_4$, $B_6$, $B_7$ and negative for byte lanes $B_3$ and $B_5$. As a result, bits 0,1,2,4,6 and 7 of the predicate register are set TRUE (1), whereas, bits 3 and 5 are set FALSE (0).

Figure 8B:
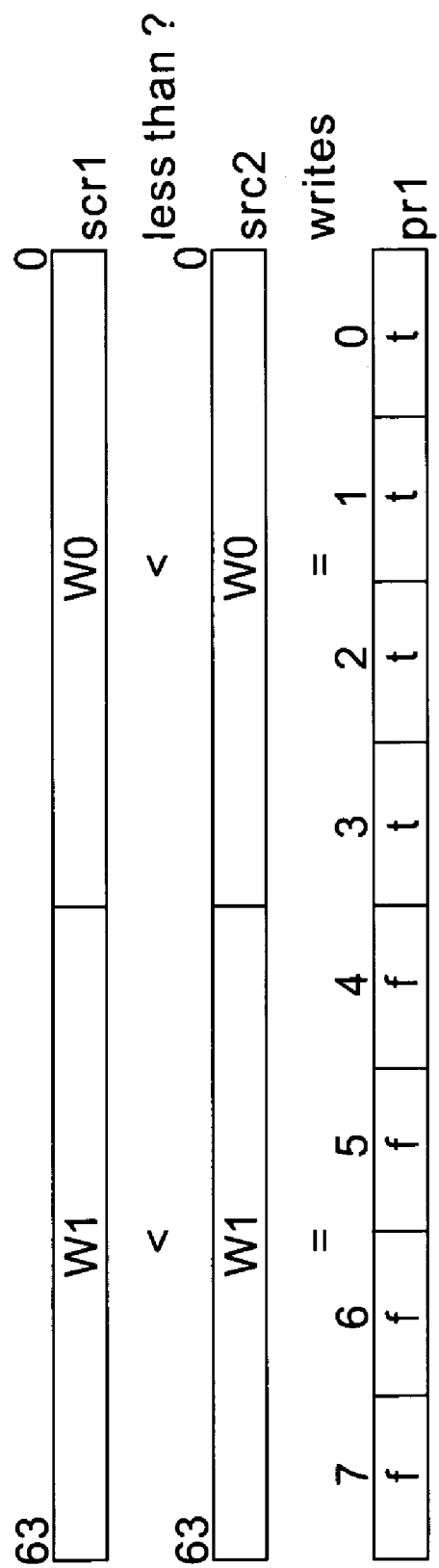
FIG. 8B illustrates a second example of a predicate register setting operation.

FIG. 8B is a schematic diagram illustrating that operations on packed objects of any predetermined size may be used to set adjacent pluralities of TRUE/FALSE values in predicate registers simultaneously. In this example a word level comparison operation is used to write to sets of 4 bits in a predicate register. According to the instruction CMPLTW Pr1, src1, src2, word sized packed objects held in the first source register src1 are compared with corresponding word sized packed objects in the second source src2 register to test for a less than relationship. The word level comparison performs two comparison sub-operations, rather than eight or four as would be required in byte or half word comparison operations, respectively. Each comparison operation sets four bits of the predicate register at the same time. The predicate bits are set TRUE (1) if the less than condition is met and FALSE (0) otherwise. The first word $W_0$ comparison writes to predicate bits 0, 1, 2 and 3 and the second word $W_1$ comparison writes to predicate bits 4, 5, 6 and 7.

There are many types of comparison and other test operations which can apply test conditions to set predicate registers. A predicate register can be set to a state with every bit TRUE by testing the Zero Register ZR for equality with itself. An instruction for this purpose reads TSTEQL Psrc, ZR, ZR. Likewise, a predicate register can be set to a state with every bit FALSE by testing the Zero Register for inequality with itself. An instruction for this purpose reads TSTNEL Psrc, ZR, ZR.

Thus, in preferred embodiments only byte-wise (per byte) conditional execution need be supported. It is possible to drive the per byte conditional execution of instructions by means of predicate setting operations using operands of any size (eg B/H/W/L). Predicate register setting processes employ per (operand) lane operations to set a predetermined number of predicate bits in a designated predicate register and, therefore, necessarily generate fewer bits of condition result than would normally arise from the operation. The ability to perform predicate setting operations over different operand lane sizes allows predicate bit setting operations to replicate predicate bits as desired.

Byte level predicate setting operations are used to set individual bits of the predicate register TRUE or FALSE. Higher level (half word, word or long word) predicate register setting operations are used to set groups of predicate register bits TRUE or FALSE. When operations are used to set groups of predicate bits each bit within the group is set to the same TRUE/FALSE value. The predicate bits are generally, but not always, set by an operation having the same lane size as the operation to be predicated. For example, a half word level predicate setting operation is typically performed to set a predicate register for use in the predication of half word level data processing operations.

Further, conditions combining logical AND and logical OR functionality may be used to set predicate registers. For example, the condition A<B and C≧D OR E=F can be coded directly using a sequence comprising comparison, predicated comparison and ORSET operations to produce a single predicate register containing the TRUE/FALSE flags for each SIMD lane of the whole expression. A suitable set of instructions for a word level predicate setting operation of this type reads: CMPLEW Pr1, srcA, srcB; Pr1, CMPGTW Pr1, srcC, srcD and TSTOREQW Pr1, srcE, srcF. Alternatively the following sequence of instructions may be used to achieve the same result: CMPLEW Pr1, srcA, srcB; CMPANDGTW Pr1, srcC, srcD and TSTOREQW Pr1, srcE, srcF.

Thus, predicated (per bit) conditional execution of predicate bit setting operations of the type described allow execution conditions based on logical "AND" to be set. These conditions can be set in the same manner regardless of operand lane size, for example using a CMPAND or TSTAND instruction.

Furthermore, predicate (per bit) conditional execution of predicate bit setting operations can also facilitate logical "OR" conditions in addition, or as an alternative, to the logical AND conditions. All such condition setting operations treat operands of different sizes in the same way and thus provide a versatile and simple way of setting complex execution conditions.

Thus, a computer instruction is implemented on packed operands containing a plurality of packed objects in respective lanes. An operation defined in a computer instruction is conditionally performed per operand lane in dependence upon single bit flags which determine for each operand lane whether or not the operation is to be executed. The flags are stored in a plurality of multi-bit predicate registers. Each predicate register comprises a plurality of flags, one for each lane on which the instruction is to be conditionally executed. Instructions which are to be conditionally executed include a bit sequence designating which of the plurality of predicate registers is to control that instruction. The described embodiment is capable of per SIMD lane conditional execution based on a single controlling predicate bit register, wherein each predicate bit i controls a plurality of result lanes p*i, p*i+1, p*i+(p−1), where p is the number of result lanes controlled by a given indicator and the results are distributed between two or more independently addressable destinations. Each of the p*i, p*i+1, . . . p*i+(p−1) is a label indicating a particular result lane in which a result from an SIMD execution channel can be sent to a destination store.

In one mode of operation the disclosed embodiment employs a predicate bit to control conditional execution on multiple result lanes. For example, the mapping operation may be described as a single predicate bit controlling p result lanes, in this example 2. This is referred to herein as 1:2 mapping. For 1:2 mapping we thus define p as 2. In other embodiments, similar principles are employed to facilitate 1:4 and or 1:8 mapping, or any other mapping ratio deemed desirable for a given application. For these examples of mapping ratios p=4 and p=8, respectively.

In other modes of operation a plurality of predicate bits each control a larger plurality of result lanes. These embodiments may employ mapping ratios of, for example, 2:4, 2:8 and/or 4:8. It will be readily apparent that other possibilities exist and the choice of which mapping ratio(s) is implemented depends on the technical requirements of the application.

A mapping ratio of 1:2 is the preferred choice in the disclosed embodiment because the multiply operation in the example produces a double-sized result. Other embodiments use p values greater than or equal to two during the generation of relatively larger result objects. It is also possible to use p values greater than or equal to two to control conditional execution of operations using the same sized source and result objects.

The described embodiment is also capable of performing per SIMD lane conditional execution based on two controlling predicate registers, whereby each predicate bit i controls a single result lane i and the results are distributed between two or more independently addressable destinations.

An advantage afforded by the facility to conditionally execute operations on lanes of packed operands according to the embodiment defined herein is that problems associated with managing information contained in test registers are eliminated. In addition, there are considerable benefits in using substantially the same instruction format for general data processing and predicate setting operations.

The term "Single Instruction Multiple Data (SIMD)" used herein refers to any computer operation using an instruction or part of an instruction to operate on multiple data objects. The nature of the operation and the size and number of objects may vary and should not be limited to those disclosed herein. Likewise, the terms "half word", "word", "long", "double long" etc. are terms of art in computer architecture fields and should not be limited to the specific bit lengths disclosed herein.

A skilled reader would readily appreciate that the invention should not be limited to specific apparatus configurations or method steps disclosed in conjunction with the preferred embodiment described. For example the preferred embodiment has been described in terms of operations which send results to one or two destination registers, but it will be appreciated that larger numbers of result stores can be accommodated. The preferred embodiment has been described in terms of specifically coded instructions but it will be apparent that different encoding schemes may provide the inventive concepts set out in the claims.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A method for conditionally performing a SIMD operation using operands from at least one source store and causing a predetermined number of result objects to be held in a combination of different ones of a plurality of destination stores, the method comprising:

receiving and decoding an instruction to determine at least one source store, a plurality of destination stores, and at least one control store, wherein said source and destination stores are capable of holding one or more source objects and result objects, respectively, each source object associated with a corresponding SIMD lane, and wherein said at least one control store comprises a plurality of pre-set indicators for controlling per SIMD lane conditional execution;

controlling conditional execution of the operation on a per SIMD lane basis using said plurality of pre-set indicators of the at least one control store designated in the instruction, wherein each said pre-set indicator is operable to control a plurality of result lanes; and sending a predetermined number of result objects to said destination stores such that the predetermined number of said result objects are held by a combination of different ones of the plurality of destination stores.

2. A method as in claim 1, wherein said controlling step comprises controlling conditional execution of the operation on a per SIMD lane basis using said plurality of pre-set indicators of the at least one control store designated in the instruction, wherein each said pre-set indicator is operable to control two result lanes.

3. A method as in claim 1, wherein the at least one control store comprises a predicate register.

4. A method as in claim 3, wherein each pre-set indicator for controlling conditional execution of a SIMD lane comprises a single bit of the predicate register.

5. A method as in claim 1, wherein the source and result objects are selected from one or more of the following: a byte; a half word comprising 16 bits; a word comprising 32 bits; a long comprising 64 bits and a double long comprising 128 bits.

6. A method as in claim 1, wherein each source and result object comprises a bit sequence, and wherein a first result object comprises a longer bit sequence than a corresponding source object.

7. A method as in claim 1, wherein a further instruction indicates first and second sets of source stores, each capable of holding one or a plurality of objects each defining a SIMD lane.

8. A method as in claim 7, wherein the per SIMD lane conditional execution of said further instruction is controlled by respective pre-set indicators of first and second control stores in combination, each said pre-set indicator controlling a single result lane.

9. A method as in claim 8, wherein the further instruction comprises two or more portions defining different operations.

10. A method as in claim 9, wherein a first portion of the further instruction includes a field indicating data processing operations are to be performed on source objects in said first and second sets of source stores contemporaneously.

11. A method as in claim 9, wherein a second portion of the further instruction defines a load/store operation to effect loading or storing accesses to a plurality of stores contemporaneously.

12. A method as in claim 10 or 11, wherein a field of the further instruction causes corresponding even and odd store address values to be issued.

13. A method as in claim 10 or 11, wherein a field of the further instruction causes a first source store address to be issued and a second source store address to be generated in connection therewith.

14. A computer system for conditionally performing a SIMD operation using operands from at least one source store and causing a predetermined number of result objects to be held in a combination of different ones of a plurality of a destination stores, the computer system comprising:
a plurality of stores;
decode circuitry for receiving and decoding an instruction and operable to determine at least one source store, a plurality of destination stores, and at least one control store, wherein each said source and destination store is capable of holding one or a plurality of source objects and result objects, respectively, each source object defining a SIMD lane, and wherein said at least one control store comprises a plurality of pre-set indicators for controlling per SIMD lane conditional execution;
a plurality of operators operable to perform the operation defined in the instruction on each said SIMD lane;
control circuitry for controlling per SIMD lane conditional execution of the operation, wherein the control circuitry comprises said at least one control store and said plurality of pre-set indicators are operable to indicate for each of a plurality of result lanes whether or not a result should be generated on that result lane, each said pre-set indicator being operable to control a plurality of result lanes; and
a plurality of destination stores connected to receive a predetermined number of result objects, wherein the predetermined number of result objects are held by a combination of different ones of the plurality of destination stores.

15. A method for conditionally performing a SIMD operation using operands from at least one source store and causing result objects to be sent to different ones of a plurality of destination stores, the method comprising:
receiving and decoding an instruction defining an operation, the instruction indicating at least one source store, a plurality of destination stores, and at least one control store, each said source and destination store being capable of holding one or a plurality of source and result objects, respectively, each source object defining a SIMD lane;
controlling per SIMD lane conditional execution of the operation, wherein respective pre-set indicators of said at least one control store are operable to control a plurality of corresponding result lanes; and
sending objects resulting from the operation on respective predetermined lanes to said plurality of destination stores.

16. A method for conditionally performing multiple data processing operations and multiple load/store operations contemporaneously, the method comprising:
providing first and second SIMD execution channels, each being capable of processing a data processing operation and a load/store operation contemporaneously;
receiving and decoding a first portion of an instruction responsive to parameters defining first and second data processing operations;
receiving and decoding a second portion of an instruction responsive to parameters defining first and second load/store operations; and
conditionally performing said first and second data processing operations and said first and second load/store operations contemporaneously on a per SIMD lane basis, wherein said first data processing operation and said first load/store operation are contemporaneously performed by said first SIMD execution channel and said second data processing operation and said second load/store operation are contemporaneously performed by said second SIMD execution channel.

17. A method for conditionally performing a SIMD operation using operands from source stores and causing a predetermined number of result objects to be held in a combination of different ones of a plurality of destination stores;
receiving and decoding instruction fields to determine first and second sets of source stores, a plurality of destination stores, each of said source and destination stores being capable of holding one or a plurality of source objects and result objects, respectively, each source object defining a SIMD lane, and first and second control stores each comprising a plurality of pre-set indicators;

controlling per SIMD lane conditional execution using said pluralities of pre-set indicators of said first and second control stores, wherein respective pre-set indicators in said first and second control stores are operable to control respective corresponding result lanes contemporaneously;

sending a predetermined number of result objects to said destination stores such that said predetermined number of said result objects are held by a combination of different ones of the plurality of destination stores.

18. A computer system for conditionally performing a SIMD operation using operands from source stores and causing a predetermined number of result objects to be held in a combination of different ones of a plurality of destination stores, the computer system comprising:

a plurality of stores including source stores, destination stores and control stores;

decode circuitry for receiving and decoding instruction fields to determine first and second sets of source stores, a plurality of destination stores, and first and second control stores each comprising a plurality of pre-set indicators, wherein each said source and destination store is capable of holding a source object and a result object, respectively, each source object defining a SIMD lane;

a plurality of operators operable to perform the operation defined in the instruction on each SIMD lane;

wherein said pluralities of pre-set indicators of said first and second control stores are operable to control per SIMD lane conditional execution, respective pre-set indicators in said first and second control stores being operable to control conditional execution of corresponding respective result lanes contemporaneously.

19. A computer program product stored in a computer readable medium comprising program code means adapted to perform the method of claim 1, 15, 16, or 17.

* * * * *